United States Patent [19]

Kennedy

[11] Patent Number: 4,822,226

[45] Date of Patent: Apr. 18, 1989

[54] WING NUT RETAINER AND EXTRACTOR

[76] Inventor: Arvest G. Kennedy, 13421 Brian Park La., Poway, Calif. 92064

[21] Appl. No.: 723,793

[22] Filed: Apr. 16, 1985

Related U.S. Application Data

[63] Continuation of Ser. No. 521,143, Aug. 8, 1983, abandoned.

[51] Int. Cl.$^4$ ............................................. F16B 21/00
[52] U.S. Cl. .................................... 411/342; 411/340; 411/346
[58] Field of Search ............... 411/15, 340, 341, 342, 411/343, 344, 345, 346

[56] References Cited

U.S. PATENT DOCUMENTS

| | | | |
|---|---|---|---|
| 1,316,857 | 9/1919 | Schilling | 411/344 |
| 2,024,871 | 12/1935 | Parsons | 411/342 |
| 2,950,141 | 8/1960 | Korr | 411/340 |
| 3,285,118 | 11/1966 | Elkins | 411/346 |
| 3,872,768 | 3/1975 | Ernst etal. | 411/345 |
| 4,116,104 | 9/1978 | Kennedy | 411/342 X |
| 4,120,231 | 10/1978 | Neumayer | 411/340 |
| 4,406,569 | 9/1983 | Askew | 411/346 |

Primary Examiner—Gary L. Smith
Assistant Examiner—Curtis B. Brueske
Attorney, Agent, or Firm—Baker, Maxham, Jester & Meador

[57] ABSTRACT

A wing nut retainer and extractor comprises an elongated open box frame having an apertured face plate with a pair of spaced apart guide rails extending from the face plate for insertion into a blind bore for holding and extracting a wing nut with the outer ends of the rails connected together and a tipping finger disposed between the rails for engaging one wing of the wing nut for tipping the nut to a position generally parallel to the rails for extracting the wing nut through a hole in a blind wall or through the aperture in the face plate.

18 Claims, 1 Drawing Sheet 4,822,226

WING NUT RETAINER AND EXTRACTOR

This is a continuation of application Ser. No. 521,143, filed Aug. 8, 1983, now abandoned.

BACKGROUND OF THE INVENTION

The present invention relates generally to fastening means and pertains particularly to a toggle bolt wing nut retaining and extracting device.

In my prior U.S. Pat. No. 4,116,104 entitled, TOGGLE BOLT WING NUT RETAINER and issued Sept. 26, 1978, I disclosed a wing nut retainer and extracting device for retaining and extracting wing nuts from behind a bore in a blind wall. My prior device utilizes friction rails for engaging and tipping the wing nut to an orientation for extraction through the wall bore and or the bore of the retainer device. One difficulty with my prior art device is the tolerance requirements that must be maintained in the manufacture of the wing nuts and in the manufacture of the retainer device in order to maintain uniform operation.

It is therefore desirable to provide an improved wing nut retainer and extraction device.

SUMMARY AND OBJECTS OF THE INVENTION

It is therefore the primary object of the present invention to provide an improved wing nut retainer and extraction device.

In accordance with the primary aspect of the present invention, a wing nut retainer and extraction device includes an apertured base plate having an aperture for passage of a wing nut and a pair of guide and holding rails extending outward from the face plate for retaining and guiding the wing nut and a tipping finger for selective engagement of and tipping the wing nut to orientation substantially parallel to the rails for extraction of the wing nut from a blind bore in a wall or like structure.

BRIEF DESCRIPTION OF THE DRAWINGS

The above and other objects and advantages of the present invention will become apparent from the following description when read in conjunction with the drawings, wherein.

DETAILED DESCRIPTION OF THE DRAWINGS

Figure 1:
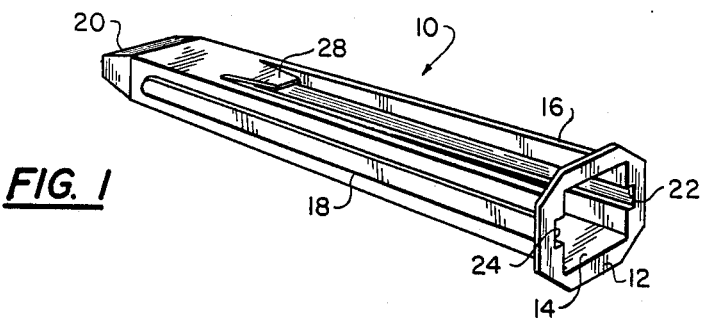
FIG. 1 is a perspective view of the retainer and extractor device.

Referring to FIG. 1 of the drawings, a retainer and extractor device in accordance with the present invention is illustrated and designated generally by the numeral 10. The retainer comprises a generally elongated open box frame structure with a front rectangular frame or face plate 12 having a generally rectangular aperture 14 therethrough. A pair of elongated opposed guide rails 16 and 18 extend outward perpendicular to the back face of the face plate 12 and are connected together at the outer end thereof by a nose member 20.

The face plate 12 need be nothing more than a radial flange at the forward end of the opposed rails 16 and 18 connecting them together and forming an abutting face for engagement with a wall structure.

The aperture 14 is of a generally rectangular configuration of a size to permit the passage of a wing nut either in its tilted or its folded configuration. The width of the aperture 14 is preferably substantially identical to that of the spacing between the side rails 16 and 18 and includes a pair of grooves 22 and 24 for receiving the protruding pins of a wing nut. The nose member 20 preferably has an opening 26 therethrough for permitting the end of a bolt to extend therethrough.

A toggle or wing nut tipping device 28 has a generally elongated flat rectangular configuration and is hinged at the inner end thereof directly to the nose member 20 such as being formed directly therewith and extends outward therefrom generally parallel to the rails 16 and 18 and parallel to the axis of the device. This tipping device or finger 28 forms a tab and preferably lies in a position as can be seen from FIG. 1, 3 and 4 just below the edges of the guide rails 16 and 18 with the surface thereof substantially flush with the edges of the rails. The tipping device or finger extends toward the face plate from the nose 26.

Figure 2:
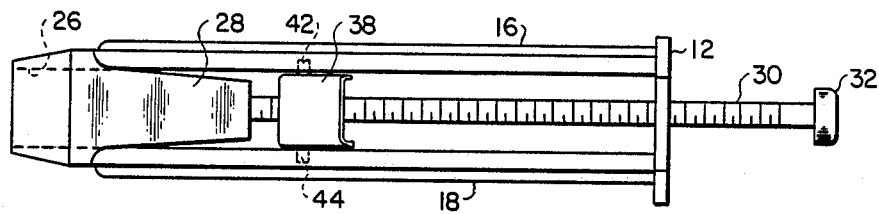
FIG. 2 is a top plan view of the retainer device of FIG. 1.
Figure 3:
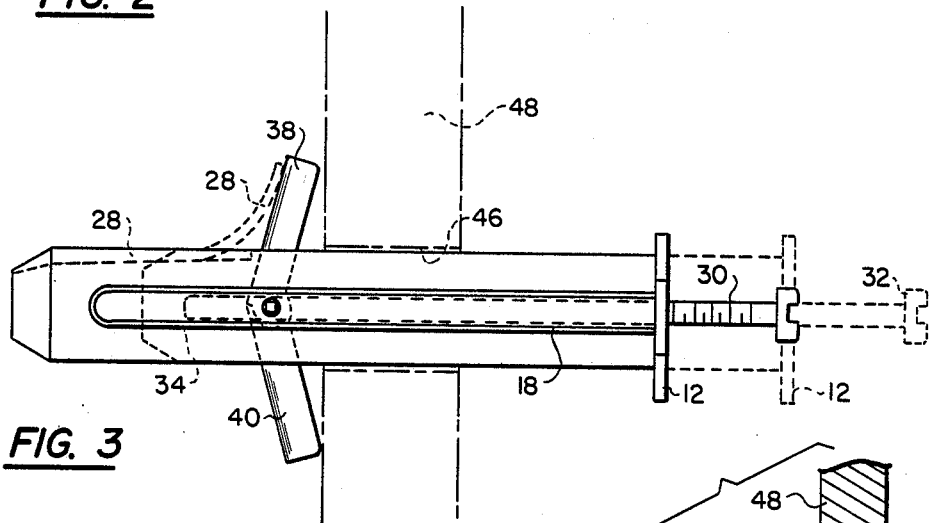
FIG. 3 is a side elevation view of the device of FIG. 1 shown in use.
Figure 5:
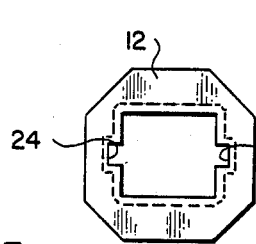
FIG. 5 is an end view of the device of FIG. 1.
Figure 4:
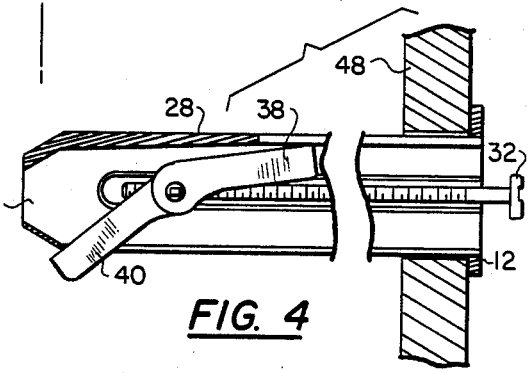
FIG. 4 is a side elevation view and section of the device of FIG. 1.

Illustrated in FIGS. 2 through 4 is one form of toggle bolt construction which the present invention is designed to accommodate. The toggle bolt includes an elongated screw or bolt 30 having a head 32 at one end and a forward end or tip 34. An expandable pivoting wing nut includes a central nut member having a pair of separate wings 38 and 40 pivoted to the central nut or screw body by means of a pair of separate pivot pins 42 and 44 extending outward at right angles to the central threaded bore of the nut.

The toggle bolt is adapted to extend through a bore 46 in a wall panel 48 and extend outward with the wings 38 and 40 extending or engaging the surface of the wall on the blind side thereof for providing a secure anchor for the bolt. Without any retainer such as the present invention, once the nut is inserted behind the wall and the bolt 30 is removed from the nut, the nut will fall from its position requiring the use of an additional nut. The nut is inserted by simply folding the wings downwards generally parallel to the axis of the screw and inserting them through the bore 46 whereupon the wings are immediately expanded by springs carried by the nut structure. Alternatively, the wings 38 and 40 are tipped to a position generally parallel to the screw axis as shown in FIG. 4 such that the nut can be inserted through the bore 46 into position. The outer end 34 of the bolt 30 must be withdrawn to a position between the central nut member and the wings to permit the wings to tilt.

With the present invention, the retainer is inserted into the bore 46 and the nut inserted through the aperture 14 in the face plate 12 with the pivot pins 44 and 46 extending into the grooves 22 and 24 such that the nut is retained in position sliding along between the two guide rails 16 and 18 until it reaches a position behind the wall 48 whereupon the springs of the nut force the wings outward into its engaging position. The nut however is retained in position between the guide rails 16 such that the bolt 30 can be removed leaving the wing nut in its position. The bolt can then be reinserted and screwed into the nut.

When it is desired to remove the wing nut, the screw 30 is moved outward such that the tip or end 34 clears the end of the nut such that wings 38 and 40 can pivot past the end 34 of the screw 30 and move to a tilted position as shown in FIG. 4. The wings of the nut are tilted to the tilted position by means of the tilting finger 28. This tilting action can be accomplished by either one of two ways. One way is by pulling the holder assembly outward as shown in phantom in FIG. 3 such that the tilting finger 28 is cammed or biased up the back side of one of the wings 38 to a position as shown whereupon movement of the device back inward permits the biasing wings of the nut to be biased or tilted downward as shown in FIG. 4 by means of the action of the tilting or tipping finger 28. This device can be utilized either with or without the screw 30 in place. Thus, there is no need to re-insert the screw 30 into the nut in order to remove it.

An alternate mode of removal is to simply screw the screw 30 outward to a position such that the end is known to clear the end of the nut to permit the wings 38, 40 to pivot and then press the wing nut outward to the outer end of the holder for engagement of one wing with the tilting or tipping finger 28 such that continued outward movement of the nut forces the wings 38 and 40 to tilt downward to a position as shown in FIG. 4 substantially parallel to the axis of screw 30 and the guide rails 16 and 18. The screw can then be removed either through the aperture 14 by pulling it out by means of the screw 30 or it can be removed by pulling the holder and retractor device outward from the bore or hole 46 in the wall 48.

The holder and retractor can be used as either a temporary or a permanent installation. Thus, it may be left in place as a holder and not removed. It may also serve simply as a temporary holder and retractor for bolts that will be ordinarily removed and replaced at least once before permanent installation.

While I have illustrated and described my invention by means of a specific embodiment, it is to be understood that numerous changes and modifications may be made therein without departing from the spririt and scope of the invention as defined in the appended claims.

Having described my invention, I now claim:

1. A wing nut holder and retractor for holding and retracting wing nuts through an aperture from behind a wall panel, comprising:
    a face plate having an aperture for passage of a wing nut therethrough when said wing nut is in either a tilted or folded position,
    a pair of elongated opposed spaced apart guide and support rails each having an outer end and an inner end and secured at said inner end to and extending outward in parallel relation from one side of said face plate for extending through an aperture in a wall panel for holding a wing nut therebetween for passage therealong behind said panel and through said aperture, and
    tipping finger means carried by said rails at the outer end thereof and normally biased to a position extending generally parallel to said rails and toward said face plate for engaging and extending outward along the back of one wing of a wing nut positioned against said panel upon movement of the holder outward from the wall panel, and for simultaneously biasing said one wing and tipping both wings of a wing nut in a common direction around the pivot axis thereof to a position extending in opposite directions generally parallel to said rail upon movement of said holder inward toward said wall panel.

2. The wing nut holder and retractor of claim 1 wherein said rails are connected together at the outer end thereof by means of a nose member.

3. The wing nut holder and retractor of claim 1 wherein said tipping means comprises a resiliently hinged finger biased to a position extending between and parallel to said rails.

4. The wing nut holder and retractor of claim 1 wherein each said rails includes an elongated groove for receiving the pivot pins of a wing nut.

5. The wing nut holder and retractor of claim 1 wherein said aperture is substantially rectangular in configuration and the width thereof is substantially equal to the spacing between said guide rails.

6. The wing nut holder and retractor of claim 2 wherein said tipping means comprises an elongated flat panel member hinged at one end to said nose member and biased to a position normally extending toward said face plate.

7. The wing nut holder and retractor of claim 6 wherein each of said rails include an elongated groove for receiving the pivot pins of a wing nut.

8. The wing nut holder and retainer of claim 7 wherein said aperture is generally rectangular in configuration and the width thereof is substantially equal to the spacing between said guide rails.

9. The wing nut holder and retractor of claim 8 wherein said tipping means comprises an elongated flat finger hinged at one end to said nose member and biased to a position extending parallel to said elongated rails.

10. A wing nut holder and retractor for holding and retracting wing nuts through an aperture from behind a wall panel comprising:
    a face frame defining an aperture for passage of a wing nut when the wing nut is either folded or tilted relative to the face frame,
    a pair of elongated opposed spaced apart guide and support rails, each having an inner end and an outer end, and secured at said inner end to and extending outward in parallel relation from one side of said face frame for extending through an aperture in a wall panel and for slideably holding a wing nut therebetween for passage therealong, and
    a tipping finger carried by and positioned between said rails at the outer end thereof and normally biased to a position extending generally parallel to said rails toward said face frame for movement with said rails for engaging and moving outward along the back of a wing of a wing nut held against said wall panel upon movement of said holder outward from said wall panel, for biasing and tipping the wings of the wing nut in a common direction around the axis thereof to a position generally parallel to side rails upon subsequent movement of the holder inward toward the wall panel, and for subsequent passage therewith outward through the aperture in the wall panel.

11. The wing nut holder and retractor of claim 10 wherein said rails are connected together at the outer end thereof by means of a nose member.

12. The wing nut holder and retractor of claim 11 wherein said tipping finger is resiliently hinged to said nose member and biased to a position extending between and parallel to said rails.

13. The wing nut holder and retractor of claim 12 wherein each said rails includes an elongated groove for receiving the pivot pins of a wing nut.

14. The wing nut holder and retractor of claim 13 wherein said aperture is substantially rectangular in configuration and the width thereof is substantially equal to the spacing between said guide rails.

15. The wing nut holder and retractor of claim 14 wherein said tipping finger comprises an elongated flat panel member hinged at one end to said nose member and biased to a position normally extending toward said face plate.

16. The wing nut holder and retractor of claim 11 wherein each of said rails include an elongated groove for receiving the pivot pins of a wing nut.

17. The wing nut holder and retainer of claim 16 wherein said aperture is generally rectangular in configuration and the width thereof is substantially equal to the spacing between said guide rails.

18. The wing nut holder and retractor of claim 17 wherein said tipping finger comprises an elongated flat member hinged at one end to said nose member and biased to a position extending toward said face frame.

* * * * *